W. MAYER.
ARTILLERY VEHICLE.
APPLICATION FILED NOV. 7, 1911.
1,045,721.
Patented Nov. 26, 1912.
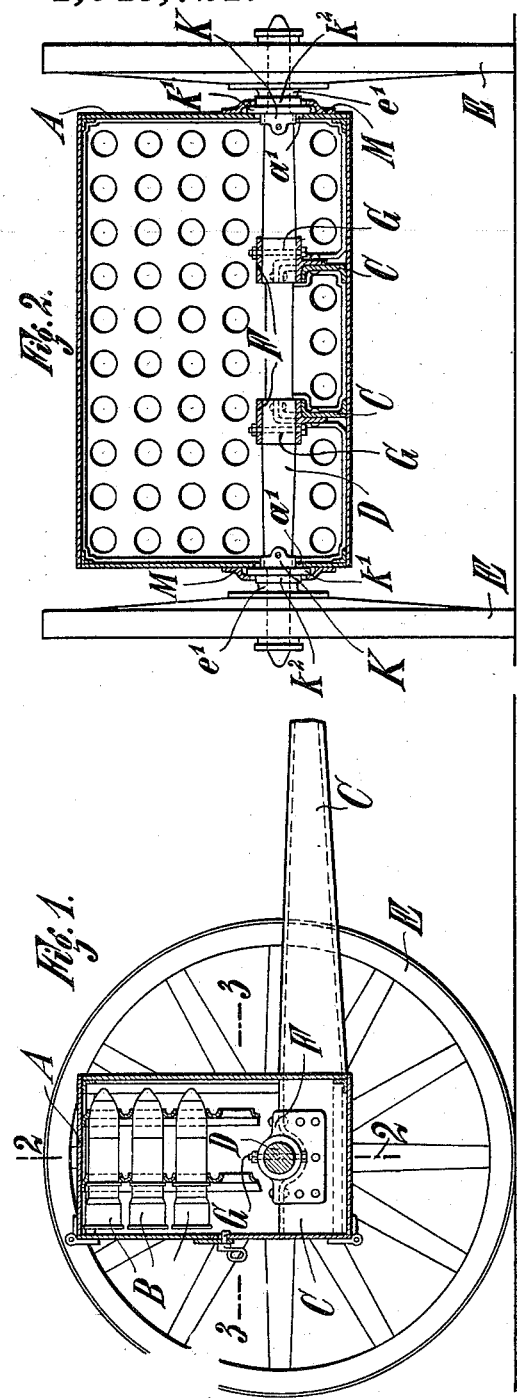
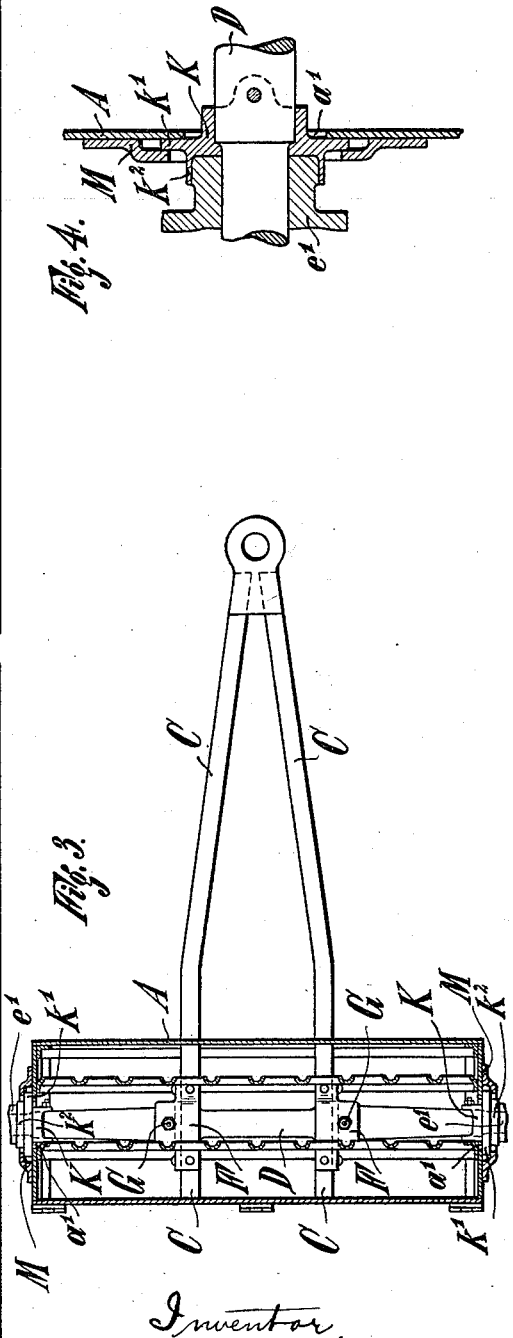

UNITED STATES PATENT OFFICE.

WILHELM MAYER, OF ESSEN-ON-THE-RUHR, GERMANY, ASSIGNOR TO FRIED. KRUPP AKTIENGESELLSCHAFT, OF ESSEN-ON-THE-RUHR, GERMANY.

ARTILLERY-VEHICLE.

1,045,721.  Specification of Letters Patent.  Patented Nov. 26, 1912.

Application filed November 7, 1911. Serial No. 659,036.

*To all whom it may concern:*

Be it known that I, WILHELM MAYER, a subject of the Emperor of Germany, and a resident of Essen-on-the-Ruhr, Germany, have invented certain new and useful Improvements in Artillery-Vehicles, of which the following is a specification.

This invention relates to artillery vehicles, and more particularly to such vehicles that are provided with cases, as for instance, ammunition wagons and limbers. In vehicles of this kind the axle is usually connected with the case or the frame of the vehicle both in the middle and near the axle arms. That kind of connection has, however, the disadvantage that the shocks produced during the travel are directly communicated to the vehicle so that the vehicle, as well as the contents of the cases (such as the ammunition) are considerably strained during the travel.

The object of the present invention is now to provide connections for the wheel axle whereby will be avoided the above mentioned disadvantage in artillery vehicles of this kind.

One embodiment of the invention is illustrated in the drawing as applied to ammunition wagons and, Figure 1 shows a vertical longitudinal section, Fig. 2, a cross section on lines 2—2 of Fig. 1, Fig. 3, a horizontal section on line 3—3, of Fig. 1, Fig. 4 shows details in larger scale.

The ammunition wagon consists principally of the case A which is adapted to hold the ammunition B, see Fig. 1, a fork C forming the framework of the vehicle with which the case is rigidly connected and lastly the wheel axle D and the wheels E. The wheel axle extends through openings $a^1$ of the sides of the case A, where play is allowed between the axle and the side plates, and near the middle of the wheel axle the traction fork C is rigidly attached. Brackets F are adapted to secure the axle to the fork C, said brackets being connected to the axle by screw bolts G and are riveted to the fork C.

To prevent dust or dirt to penetrate into the case through the openings $a^1$ where the wheel axle extends through the sides of the case, the following arrangement has been provided.

An axle box K, see Fig. 4, is secured at each arm of the wheel axle. These axle boxes K have each a wide flange $k^1$ on the inside lying against the side of the case and on the outside over-lapped by plates M, which plates are secured to the case. To prevent the penetration of dust between the boxes K and the wheel hub $e^1$ each box is further provided with a circular sleeve extension $k^2$ inclosing the inner end of their respective hub.

As the wheel axle is only rigidly connected with the case or the framework at its middle part, the two arms of the wheel axle are free to bend, when strained by any shock during travel, so that these shocks are almost altogether taken up by the wheel axle, that means that only a very small part is carried over to the vehicle and its contents.

I claim:—

1. In an artillery vehicle, the combination with a wheel axle and an ammunition case, of axle brackets situated near the middle of the wheel axle; said brackets adapted to firmly connect said wheel axle and said case; openings in the sides of the case for said wheel axle; said openings being larger than the cross section of the wheel axle to permit play between them.

2. In an artillery vehicle, the combination with a wheel axle and an ammunition case, of axle brackets situated near the middle of the wheel axle; said brackets adapted to firmly connect said wheel axle and said case; openings in the sides of said case for said wheel axle, said openings being larger than the cross section of the wheel axle; dust proof covers for said openings.

3. In an artillery vehicle, the combination with a wheel axle and an ammunition case, of axle brackets situated near the middle of the wheel axle; said brackets adapted to firmly connect said wheel axle and said case; openings in the sides of said case for said wheel axle; said openings being larger than the cross section of the wheel axle; dust proof covers for said openings; comprising axle boxes tightly secured on the wheel axle, a radial flange on each axle box larger than, and entirely covering said opening, a sleeve extension on each axle box engaging the hub of the wheel, cover plates firmly attached to the sides of said case engaging the radial flanges of said axle boxes, an opening in each of said cover plates of smaller cross section than the cross section of said radial flanges.

The foregoing specification signed at Barmen, Germany, this 17th day of October, 1911.

WILHELM MAYER. [L. S.]

In presence of—
  CHAS. J. WRIGHT,
  HELEN NUFER.

Copies of this patent may be obtained for five cents each, by addressing the "Commissioner of Patents, Washington, D. C."